United States Patent
Büttner et al.

(10) Patent No.: US 12,306,603 B2
(45) Date of Patent: May 20, 2025

(54) CONFIGURATION-FREE OUTPUT OF USER DATA CONTAINED IN ETHERNET TELEGRAMS

(71) Applicant: Endress+Hauser Process Solutions AG, Reinach (CH)

(72) Inventors: Karl Büttner, Neuenburg (DE); Olivier Wolff, Basel (CH); Oliver Zwick, Durach (DE); Bastian Engel, Grenzach (DE); Stefan Maier, Rheinfelden (DE); Martin Lohmann, Gerlingen (DE); Michael Bückel, Lörrach (DE); Mirko Brcic, Rheinfelden (CH)

(73) Assignee: Endress+Hauser Process Solutions AG, Reinach (CH)

( * ) Notice: Subject to any disclaimer, the term of this patent is extended or adjusted under 35 U.S.C. 154(b) by 587 days.

(21) Appl. No.: 17/611,382

(22) PCT Filed: Apr. 22, 2020

(86) PCT No.: PCT/EP2020/061191
§ 371 (c)(1),
(2) Date: Nov. 15, 2021

(87) PCT Pub. No.: WO2020/229115
PCT Pub. Date: Nov. 19, 2020

(65) Prior Publication Data
US 2022/0206452 A1 Jun. 30, 2022

(30) Foreign Application Priority Data
May 16, 2019 (DE) ..................... 10 2019 112 894.3

(51) Int. Cl.
*G05B 19/042* (2006.01)
*G05B 19/04* (2006.01)

(52) U.S. Cl.
CPC ....... *G05B 19/0423* (2013.01); *G05B 19/041* (2013.01); *G05B 2219/25028* (2013.01);
(Continued)

(58) Field of Classification Search
CPC .............. G05B 19/0423; G05B 19/041; G05B 2219/25028; G05B 2219/25174; G05B 2219/25428; H04L 67/12
See application file for complete search history.

(56) References Cited

U.S. PATENT DOCUMENTS

2007/0057783 A1* 3/2007 Reller .................. G05B 19/042
340/538
2007/0088528 A1* 4/2007 Miller .................. G05B 23/024
702/185

(Continued)

FOREIGN PATENT DOCUMENTS

DE 102008019053 A1 10/2009
DE 102008043683 A1 5/2010
(Continued)

*Primary Examiner* — Tameem D Siddiquee
(74) *Attorney, Agent, or Firm* — Mark A. Logan; Endress+Hauser (USA) Holding, Inc.

(57) ABSTRACT

A device for the extraction of user data out of Ethernet telegrams sent from a field device comprises an input interface and an output interface for connecting to an Ethernet data line, wherein the input interface is designed to receive Ethernet telegrams transmitted via the Ethernet data line; an electronics unit which is designed to evaluate the received Ethernet telegrams and to extract a value of at least one process variable out of the user data portions of the received Ethernet telegrams; and an output unit for outputting the determined process variables. The invention also relates to a system comprising the device according to the invention.

8 Claims, 2 Drawing Sheets

(52) U.S. Cl.
CPC .............. *G05B 2219/25174* (2013.01); *G05B 2219/25428* (2013.01)

(56) References Cited

U.S. PATENT DOCUMENTS

| | | | |
|---|---|---|---|
| 2008/0075012 A1 | 3/2008 | Zielinski et al. | |
| 2008/0089595 A1* | 4/2008 | Park | H04N 19/90 382/233 |
| 2018/0367043 A1* | 12/2018 | Dotson | H04L 12/10 |
| 2020/0296165 A1* | 9/2020 | Von Hoyningen-Huene | H04L 41/0823 |

FOREIGN PATENT DOCUMENTS

| | | |
|---|---|---|
| DE | 102010020446 A1 | 11/2011 |
| DE | 102013218566 A1 | 3/2015 |
| DE | 102013112875 A1 | 6/2015 |
| DE | 102016125169 A1 | 6/2018 |
| EP | 1892885 A1 | 2/2008 |
| EP | 3056953 A1 | 8/2016 |

\* cited by examiner

CONFIGURATION-FREE OUTPUT OF USER DATA CONTAINED IN ETHERNET TELEGRAMS

CROSS-REFERENCE TO RELATED APPLICATIONS

The present application is related to and claims the priority benefit of German Patent Application No. 10 2019 112 894.3, filed on May 16, 2019 and International Patent Application No. PCT/EP2020/061191 filed on Apr. 22, 2020, the entire contents of which are incorporated herein by reference.

TECHNICAL FIELD

The invention relates to a device for the extraction of user data out of Ethernet telegrams sent from a field device. The invention furthermore comprises a system comprising a device according to the invention.

BACKGROUND

Field devices that are used in industrial facilities are already known from the prior art. Field devices are often used in automation engineering as well as in manufacturing automation. In principle, all devices which are process-oriented and which supply or process process-relevant information are referred to as field devices. Field devices represent a sub-class of the term "sensor systems". Field devices are thus used for detecting and/or influencing process variables. Sensor systems serve for detecting process variables. These are used, for example, for pressure and temperature measurement, conductivity measurement, flow measurement, pH measurement, fill level measurement etc., and detect the corresponding process variables of pressure, temperature, conductivity, pH value, fill level, flow etc. Actuator systems are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A variety of such field devices is produced and marketed by the Endress+Hauser group.

The measured values recorded by the field devices, especially by sensors, are transmitted via the connected bus system to one, or possibly even several, higher-level unit(s). Data transmission from the higher-level unit to the field devices via the bus system is used especially for configuring and parametrizing field devices, or for diagnostic purposes. Generally speaking, the field device is operated or controlled by the higher-level unit via the bus system. The power supply of the field devices connected to a field bus, in which the corresponding bus protocol is implemented, likewise takes place via the respective field bus.

A disadvantage of the field buses known in automation technology are their relatively low transfer rates. Since field devices are becoming increasingly complex in their functionality, this leads to long transmission times, especially in the case of parametrization and configuration but also in the case of the transmission of large sets of measurement data from the field device to the control unit, which is of course disadvantageous for the customer, i.e. the operator of the process plant.

It has therefore become known in automation technology to transmit the data between the control level and the field level, or vice versa, via an Ethernet data line. The field devices, but also the other participants in the bus system (controller, remote I/Os etc.), hereby receive a direct Ethernet connection.

The process variables recorded by the field device are transmitted via the Ethernet data line to the control center of the plant, where they are processed. It is not provided that the collected process variables are made directly viewable in the field.

SUMMARY

Proceeding from this problem, the invention is based on the object of making user data of a field device which are transmitted via Ethernet telegrams already viewable at the field level of a plant.

With regard to the device, a device for extraction of user data out of Ethernet telegrams sent from a field device is provided, comprising:
  an input interface and an output interface for connecting to an Ethernet data line, wherein the input interface is designed to receive Ethernet telegrams transmitted via the Ethernet data line;
  an electronics unit which is designed to evaluate the received Ethernet telegrams and to extract a value of at least one process variable out of the user data portions of the received Ethernet telegrams; and
  an output unit for outputting the determined process variables.

An outputting of user data from field devices at the field level of the plant is enabled by means of the device according to the invention. According to the invention, the user data are values of process variables, measured value status, and diagnostic information. For this purpose, the device also reads Ethernet telegrams which are sent via an Ethernet data line, and determines from the Ethernet telegrams the values of the process variables. The device does not need to be advertised or addressed in the Ethernet network, and thereby represents a plug-and-play component.

According to an advantageous development of the device according to the invention, it is provided that the device further comprises: A memory unit, wherein the memory unit comprises a database with device description data of a plurality of field device types, wherein the device description data comprise information for interpreting the user data portions of the field devices, especially the data type and/or the user data length.

According to a preferred development of the device according to the invention, it is provided that the electronics unit is designed to determine the structure of the process variables to be determined, doing so on the basis of commonalities of the user data portion of the Ethernet telegrams with information stored in the database for interpreting the user data portions. Different field devices sometimes use different formats of the value of the process variables in an Ethernet telegram, for which reason the device must be configured for the corresponding field device. By keeping the device descriptions of various devices in the memory unit, the device is enabled to independently determine in which form the user data portion is present in the telegram and how this can be interpreted. In the simplest form, it can hereby be provided that the electronics unit of the device compares, on a tabular basis, the user data portion of the Ethernet telegram with the entries in the database, and thereby obtains information for interpreting the user data portion. A more complex alternative provides that the electronics unit uses an AI (artificial intelligence) algorithm which determines commonalities of the user data portion of the Ethernet telegrams with information held in the database, whereby information for interpreting the user data portion are thereby obtained.

According to an advantageous development of the device according to the invention, it is provided that the output unit is a display unit, especially a display which is designed to display the determined process variables. For example, a 7-segment display is used.

Alternatively, the output unit is a further interface, especially a radio interface, via which the process variable can be retrieved in a protocol different from the Ethernet protocol that is used, especially from an operating unit.

According to an advantageous development of the device according to the invention, it is provided that the device has an internal connection of the input interface to the output interface, wherein the internal connection is designed to forward the Ethernet telegrams incoming at the input interface to the output interface without loss. In the simplest instance, this is hereby an electronic connection, for example a metal wire connection, or a connection on a printed circuit board. The Ethernet data line is thus extended by this connection so that the Ethernet telegram is passed passively through the device between the input interface and the output interface. Alternatively, it is provided that the device "stops" the Ethernet telegram, i.e. receives it, without passively forwarding it, then evaluates it and itself actively retransmits it to the recipient.

According to an advantageous development of the device according to the invention, it is provided that the internal connection has a tap connected to the electronics unit. Via this tap, the electronics unit can also read the Ethernet telegram without modifying the Ethernet telegram itself or modifying the data traffic on the Ethernet data line.

With regard to the system, it is provided that the system comprises:
- a device according to the invention;
- a field device of automation technology, wherein the field device is designed to acquire at least one process variable of a process engineering process;
- a higher-level unit; and
- an Ethernet data line, wherein the Ethernet data line consists of a first segment and a second segment, wherein the first segment connects the output interface of the device to the higher-level unit, and wherein the second segment connects the field device to the input interface of the device, wherein the field device is designed to create Ethernet telegrams containing a value of the acquired process variable and to transmit them to the higher-level unit via the Ethernet data line.

The device according to the invention is thus installed in an Ethernet data line between the higher-level unit and the field device. Such an Ethernet data line exclusively connects a single field device to the higher-level unit. The device therefore does not need to be configured with respect to the field device, i.e. not to the network address of the field device, for example. It is provided that a separate device is to be used for each Ethernet data line.

According to a first advantageous variant of the system according to the invention, it is provided that the higher-level unit or a separate power supply module is designed to supply electrical energy to the device and the field device via the Ethernet data line.

According to an advantageous development of the first variant of the system according to the invention, it is provided that the Ethernet data line is a Power-over-Ethernet data line, especially an EtherNet/IP, PROFINET, Modbus TCP, or HART-IP data line.

According to a preferred development of the first variant of the system according to the invention, it is provided that the higher-level unit is a switch or a power switch.

According to a second advantageous variant of the system according to the invention, it is provided that the system further comprises a power supply module independent of the Ethernet data line, which power supply module is designed to supply the device with electrical energy.

According to an advantageous embodiment of the second variant of the system according to the invention, it is provided that the higher-level unit is a controller.

BRIEF DESCRIPTION OF THE DRAWINGS

The invention is explained in greater detail with reference to the following Figures. The following is shown.

Figure 1:
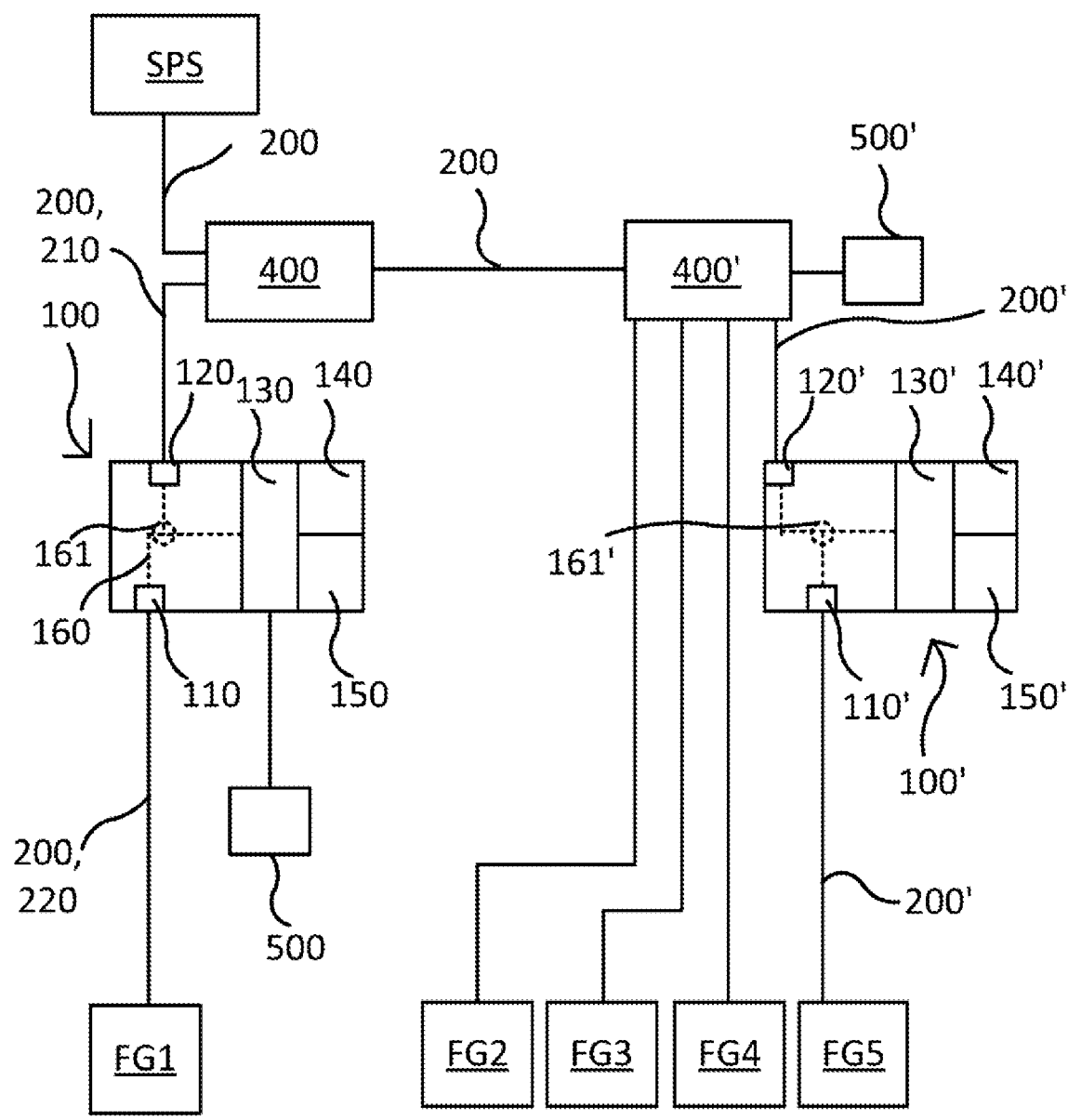
FIG. 1 shows several exemplary embodiments of the device according to the present disclosure.

Schematically shown in FIG. 1 is a network in an automation technology plant. The network consists of a control unit SPS, of higher-level (network) units 400, 400', of field devices FG1, FG2, FG3, FG4, FG5, and of an Ethernet data line 200 connecting these components SPS, 400, 400', FG1, FG2, FG3, FG4, FG5. The Ethernet data line 200 corresponds to an industrial Ethernet standard, for example Profinet, Ethernet/IP, Modbus TCP etc. Such a data line enables routes of up to 100 m between the individual participants if a copper line is used. The individual participants SPS, 400, FG1 hereby require their own power supply.

The data line 200 of the higher-level unit 400 to the field device FG1 is divided into a first segment 210 and a second segment 220. The first segment 210 connects the higher-level unit 400 to a device 100 according to the invention. The second segment 220 connects the device 100 according to the invention to the field device FG1. The device hereby has an input interface 110 for connecting to the second segment 220 and an output interface 120 for connecting to the first segment 210.

The device 100 has an internal connection 160 between the input interface 110 and the output interface 120. This is designed in such a way that telegrams which are sent from the field device FG1 to the higher-level unit 400, or vice versa, can be routed through the device without loss. Neither the higher-level unit 400 nor the field device FG1 therefore "notice" that the device is located in the data line 200 connecting the higher-level unit 400 to the field device FG1.

Via a tap 161, the device is enabled to listen to the telegrams 300 exchanged between the field device FG1 and the higher-level unit 400. For this purpose, the device 100 has an electronics unit 130, for example an ASIC or a microprocessor, which is designed for this purpose. The electronics unit 130 has an algorithm or implements a program which serves the purpose of analyzing the intercepted telegrams 300 and extracting the user data portion 310 from the telegrams.

Figure 2:
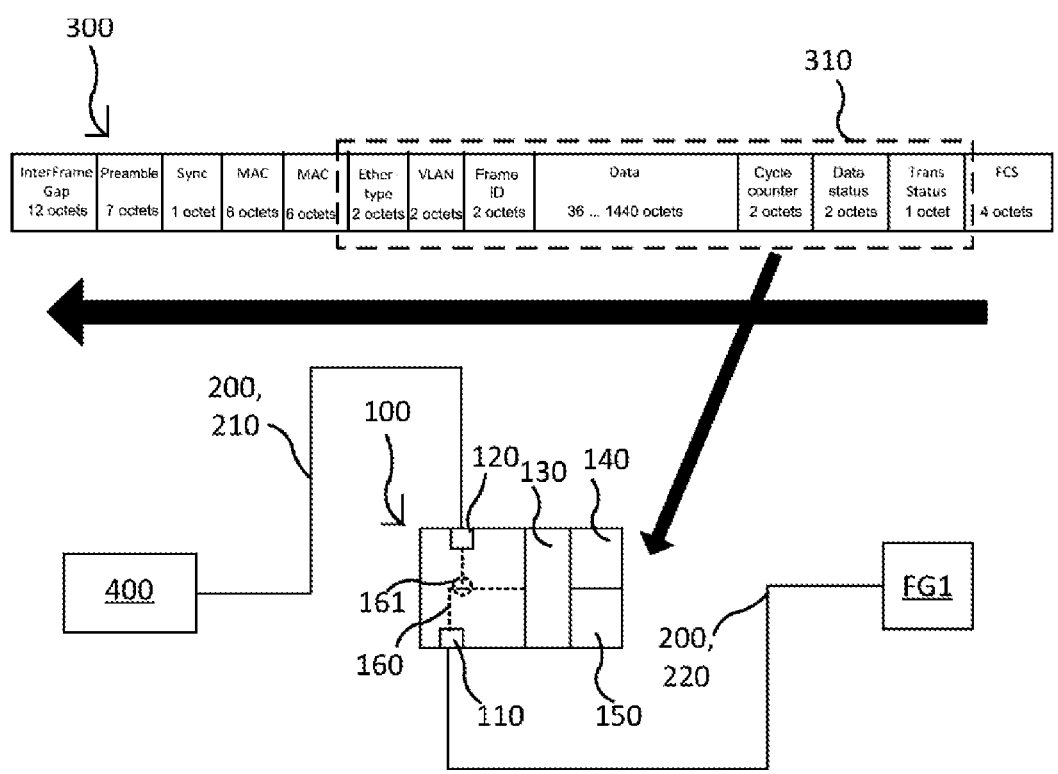
FIG. 2 shows a schematic structure of an Ethernet telegram.

A typical telegram structure of an Ethernet telegram 300 is shown in FIG. 2. After an introductory part of the telegram, the user data portion 310 begins. The electronics unit 130 is designed especially to recognize the "Data" data part of the user data portion 130. This contains especially the values of the process variables, measured value status, and/or diagnostic information that have been captured by the field device FG1. However, this data part depends on the type and/or manufacturer of a field device and varies especially in the data size and/or in the structure, especially also depending on the type of process variable acquired, for example.

By means of the implemented program or the algorithm, the electronics unit 130 is therefore designed to determine the structure of the data part and the data to be extracted therefrom on the basis of commonalities of the user data portion of the Ethernet telegrams 300 with information for interpreting the user data portions stored in a memory unit 150 of the device. By keeping device descriptions of various devices in the memory unit 150, the device is enabled to independently determine the form in which the user data portion is present in the telegram 300 and how this can be interpreted. In the simplest form, it can hereby be provided that the electronics unit of the device compares, on a tabular basis, the user data portion of the Ethernet telegram 300 with the entries in the memory unit 150, and thereby obtains information for interpreting the user data portion. A more complex alternative provides that the electronics unit 130 uses an AI (artificial intelligence) algorithm which determines commonalities of the user data portion of the Ethernet telegrams with information held in the memory unit 150, thereby obtaining information for interpreting the user data portion.

The read-out and interpreted user data portion is subsequently output or reproduced by means of an output unit 140 of the device 100. In the simplest instance, the output unit 140 is a display unit, especially a display which is designed to display the interpreted user data portion, especially the value of the process variables. For example, a 7-segment display is used.

Alternatively, the output unit 140 is a further interface, especially a radio interface, via which the process variable can be retrieved, especially from an operating unit, in a protocol different from the Ethernet protocol that is used, for example Bluetooth or WiFi.

A portion of the Ethernet data line (this portion is designated 200') uses an Ethernet standard different from that of the Ethernet data line 200, for example a standard compliant with IEEE802.3 (10 BASE-TIL)/IEC 60079 (final specification expected by the end of 2019). It is hereby possible to supply power to the field devices via the Ethernet data line (Power-over-Ethernet). Specifically, the data lines 200' departing from the higher-level unit 400' are designed to carry electrical energy to the participants FG2, FG3, FG4, FG5, 100'. For this purpose, the higher-level unit 400' is connected to an external power supply module 500'. Via the data lines 200', the external power supply module supplies not only the higher-level unit 400' directly but also the participants FG2, FG3, FG4, FG5, 100' with their electrical energy required for operation.

The invention claimed is:

1. A device for extraction of user data from Ethernet telegrams sent from a field device, the device comprising:
    an output interface for connecting the device to a first segment of an Ethernet data line;
    an input interface for connecting the device to a second segment of the Ethernet data line, wherein the input interface is designed to receive Ethernet telegrams transmitted via the Ethernet data line;
    an internal connection connecting the input interface to the output interface, wherein the internal connection is designed to forward the received Ethernet telegrams incoming at the input interface to the output interface without loss;
    a tapping of the internal connection;
    an electronics unit including a microprocessor or an application-specific integrated circuit (ASIC), wherein the electronics unit is connected to the tapping and is thereby enabled to read the received Ethernet telegrams via the tapping without modifying the received Ethernet telegrams or modifying data traffic on the first Ethernet data line;
    a memory unit comprising a database with device description data of a plurality of field device types, wherein the device description data comprise information for interpreting a user data portion of the received Ethernet telegrams, including a data type and a user data length; and
    an output unit,
    wherein the electronics unit is designed to evaluate the received Ethernet telegrams and to extract a value of at least one process variable from a user data portion of the received Ethernet telegrams,
    wherein the electronics unit is further designed to determine a structure of the at least one process variable on the basis of commonalities of the user data portion of the received Ethernet telegrams with information stored in the database for interpreting the user data portion, and
    where in the output unit is configured to output the value of the at least one process variable.

2. The device according to claim 1, wherein the output unit is a display unit designed to display the value of the at least one process variables.

3. A system, comprising:
    a device for extraction of user data from Ethernet telegrams sent from a field device, the device including:
        an output interface for connecting the device to a first segment of an Ethernet data line;
        an input interface for connecting the device to a second segment of the Ethernet data line, wherein the input interface is designed to receive Ethernet telegrams transmitted via the Ethernet data line;
        an internal connection connecting the input interface to the output interface, wherein the internal connection is designed to forward the received Ethernet telegrams incoming at the input interface to the output interface without loss;
        a tapping of the internal connection;
        an electronics unit including a microprocessor or an application-specific integrated circuit (ASIC), wherein the electronics unit is connected to the tapping and is thereby enabled to read the received Ethernet telegrams via the tapping without modifying the received Ethernet telegrams or modifying data traffic on the first Ethernet data line;
        a memory unit comprising a database with device description data of a plurality of field device types, wherein the device description data comprise information for interpreting a user data portion of the received Ethernet telegrams, including a data type and a user data length; and
        an output unit,
        wherein the electronics unit is designed to evaluate the received Ethernet telegrams and to extract a value of at least one process variable from a user data portion of the received Ethernet telegrams,
        wherein the electronics unit is further designed to determine a structure of the at least one process variable on the basis of commonalities of the user data portion of the received Ethernet telegrams with information stored in the database for interpreting the user data portion, and where in the output unit is configured to output the value of the at least one process variable;

a field device of automation technology, wherein the field device is designed to acquire the value of the at least one process variable;

a higher-level unit;

the first Ethernet data line, wherein the first Ethernet data line connects the field device to the input interface of the device; and the second Ethernet data line, wherein the second Ethernet data line connects the output interface of the device to the higher-level unit, wherein the field device is designed to create the Ethernet telegrams containing the value of the at least once process variable and to transmit the Ethernet telegrams to the higher-level unit via the Ethernet data line.

4. The system according to claim 3, wherein the higher-level unit or a separate power supply module is designed to supply electrical energy to the device and the field device via the Ethernet data line.

5. The system according to claim 4, wherein the Ethernet data line is a Power-over-Ethernet data line, including an EtherNet/IP, PROFINET, Modbus TCP, or HART-IP data line.

6. The system according to claim 5, wherein the higher-level unit is a switch or a power switch.

7. The system according to claim 3, further comprising:

a power supply module that is independent of the Ethernet data line and is designed to supply electrical energy to the device.

8. The system according to claim 3, wherein the higher-level unit is a controller.

* * * * *